United States Patent
Delgado et al.

(10) Patent No.: US 11,244,244 B1
(45) Date of Patent: Feb. 8, 2022

(54) MACHINE LEARNING SYSTEMS ARCHITECTURES FOR RANKING

(71) Applicant: GROUPON, INC., Chicago, IL (US)

(72) Inventors: Joaquin Delgado, Palo Alto, CA (US); Roger Henry Castillo, Palo Alto, CA (US); Boris Lerner, Mountain View, CA (US); Ramesh Maddula, Mountain View, CA (US); Emma Sawin, Palo Alto, CA (US); Alvaro Viloria, Santa Clara, CA (US); Jikai Lei, Foster City, CA (US)

(73) Assignee: GROUPON, INC., Chicago, IL (US)

( * ) Notice: Subject to any disclaimer, the term of this patent is extended or adjusted under 35 U.S.C. 154(b) by 275 days.

(21) Appl. No.: 16/667,141

(22) Filed: Oct. 29, 2019

Related U.S. Application Data

(60) Provisional application No. 62/752,244, filed on Oct. 29, 2018.

(51) Int. Cl.
   *G06N 20/00* (2019.01)
   *G06N 5/04* (2006.01)
   *G06F 16/2457* (2019.01)

(52) U.S. Cl.
   CPC ....... *G06N 20/00* (2019.01); *G06F 16/24578* (2019.01); *G06N 5/04* (2013.01)

(58) Field of Classification Search
   CPC .................. G06N 20/00; G06F 16/24578
   See application file for complete search history.

(56) References Cited

U.S. PATENT DOCUMENTS

| | | | | |
|---|---|---|---|---|
| 8,209,331 B1* | 6/2012 | Garg | ..................... | G06F 16/332 |
| | | | | 707/734 |
| 2011/0252014 A1* | 10/2011 | Mital | .................. | G06F 16/9535 |
| | | | | 707/706 |
| 2014/0280441 A1* | 9/2014 | Jacobson | ................ | H04L 67/10 |
| | | | | 709/201 |
| 2014/0282605 A1* | 9/2014 | Jacobson | .............. | G06F 9/5066 |
| | | | | 718/107 |
| 2020/0341987 A1* | 10/2020 | Wright | ................... | G06N 20/00 |
| 2021/0055977 A1* | 2/2021 | Lisuk | ..................... | G06F 9/547 |

* cited by examiner

*Primary Examiner* — Asher D Kells
(74) *Attorney, Agent, or Firm* — Alston & Bird LLP

(57) ABSTRACT

Computing systems, computing apparatuses, computing methods, and computer program products are disclosed for machine learning ranking. An example computing method includes receiving a search query and determining a plurality of machine learning model execution engines based on the search query and a plurality of search result types. The example computing method further includes generating a plurality of subsets of search results based on the search query and the plurality of machine learning model execution engines. The example computing method further includes generating a set of search results comprising at least one search result from each of the plurality of subsets of search results.

20 Claims, 5 Drawing Sheets

MACHINE LEARNING SYSTEMS ARCHITECTURES FOR RANKING

CROSS-REFERENCE TO RELATED APPLICATIONS

The present application claims priority to U.S. Provisional Application No. 62/752,244, entitled "Machine Learning Systems Architectures for Ranking," filed Oct. 29, 2018, the contents of which are incorporated by reference herein in their entirety.

BACKGROUND

The inventors have discovered problems with existing mechanisms for performing ranking operations. Through applied effort, ingenuity, and innovation, the inventors have solved many of these identified problems by developing solutions embodied by the present disclosure and described in detail below.

BRIEF SUMMARY

Systems, apparatuses, methods, and computer program products are disclosed herein for performing ranking operations by combining search results generated using different machine learning model execution engines for different search result types.

In one example embodiment, a computing system is provided for performing machine learning ranking operations. The computing system may comprise application programming interface (API) circuitry configured to receive a search query. The computing system may further comprise machine learning model determination circuitry configured to determine a first machine learning model execution engine based on the search query and a first search result type. The machine learning model determination circuitry may be further configured to determine a second machine learning model execution engine based on the search query and a second search result type. The computing system may further comprise machine learning model execution circuitry configured to generate a first subset of search results based on the first machine learning model execution engine and the search query. The machine learning model execution circuitry may be further configured to generate a second subset of search results based on the second machine learning model execution engine and the search query. The computing system may further comprise machine learning ranking circuitry configured to generate a set of search results comprising at least one search result from the first subset of search results and at least one search result from the second subset of search results.

In another example embodiment, a computing apparatus is provided for performing machine learning ranking operations. The computing apparatus may comprise API circuitry configured to receive a search query. The computing apparatus may further comprise machine learning model determination circuitry configured to determine a first machine learning model execution engine based on the search query and a first search result type. The machine learning model determination circuitry may be further configured to determine a second machine learning model execution engine based on the search query and a second search result type. The computing apparatus may further comprise machine learning model execution circuitry configured to generate a first subset of search results based on the first machine learning model execution engine and the search query. The machine learning model execution circuitry may be further configured to generate a second subset of search results based on the second machine learning model execution engine and the search query. The computing apparatus may further comprise machine learning ranking circuitry configured to generate a set of search results comprising at least one search result from the first subset of search results and at least one search result from the second subset of search results.

In another example embodiment, a computing method is provided for performing machine learning ranking operations. The computing method may comprise receiving, by API circuitry, a search query. The computing method may further comprise determining, by machine learning model determination circuitry, a first machine learning model execution engine based on the search query and a first search result type. The computing method may further comprise determining, by the machine learning model determination circuitry, a second machine learning model execution engine based on the search query and a second search result type. The computing method may further comprise generating, by machine learning model execution circuitry, a first subset of search results based on the first machine learning model execution engine and the search query. The computing method may further comprise generating, by the machine learning model execution circuitry, a second subset of search results based on the second machine learning model execution engine and the search query. The computing method may further comprise generating, by machine learning ranking circuitry, a set of search results comprising at least one search result from the first subset of search results and at least one search result from the second subset of search results.

In another example embodiment, a computer program product is provided for performing machine learning ranking operations. The computer program product comprises at least one non-transitory computer-readable storage medium storing program instructions that, when executed, may cause a system to receive, by API circuitry, a search query. The program instructions, when executed, may further cause the system to determine, by machine learning model determination circuitry, a first machine learning model execution engine based on the search query and a first search result type. The program instructions, when executed, may further cause the system to determine, by the machine learning model determination circuitry, a second machine learning model execution engine based on the search query and a second search result type. The program instructions, when executed, may further cause the system to generate, by machine learning model execution circuitry, a first subset of search results based on the first machine learning model execution engine and the search query. The program instructions, when executed, may further cause the system to generate, by the machine learning model execution circuitry, a second subset of search results based on the second machine learning model execution engine and the search query. The program instructions, when executed, may further cause the system to generate, by machine learning ranking circuitry, a set of search results comprising at least one search result from the first subset of search results and at least one search result from the second subset of search results.

The foregoing brief summary is provided merely for purposes of summarizing some example embodiments illustrating some aspects of the present disclosure. Accordingly, it will be appreciated that the above-described embodiments are merely examples and should not be construed to narrow the scope of the present disclosure in any way. It will be appreciated that the scope of the present disclosure encompasses many potential embodiments in addition to those summarized herein, some of which will be described in further detail below.

BRIEF DESCRIPTION OF THE DRAWINGS

The accompanying drawings, which are not necessarily drawn to scale, illustrate embodiments and features of the present disclosure. Together with the specification, including the brief summary above and the detailed description below, the accompanying drawings serve to explain the embodiments and features of the present disclosure. The components illustrated in the figures represent components that may or may not be present in various embodiments or features of the disclosure described herein. Accordingly, some embodiments or features of the present disclosure may include fewer or more components than those shown in the drawings while not departing from the scope of the disclosure.

DETAILED DESCRIPTION

Figure 1:
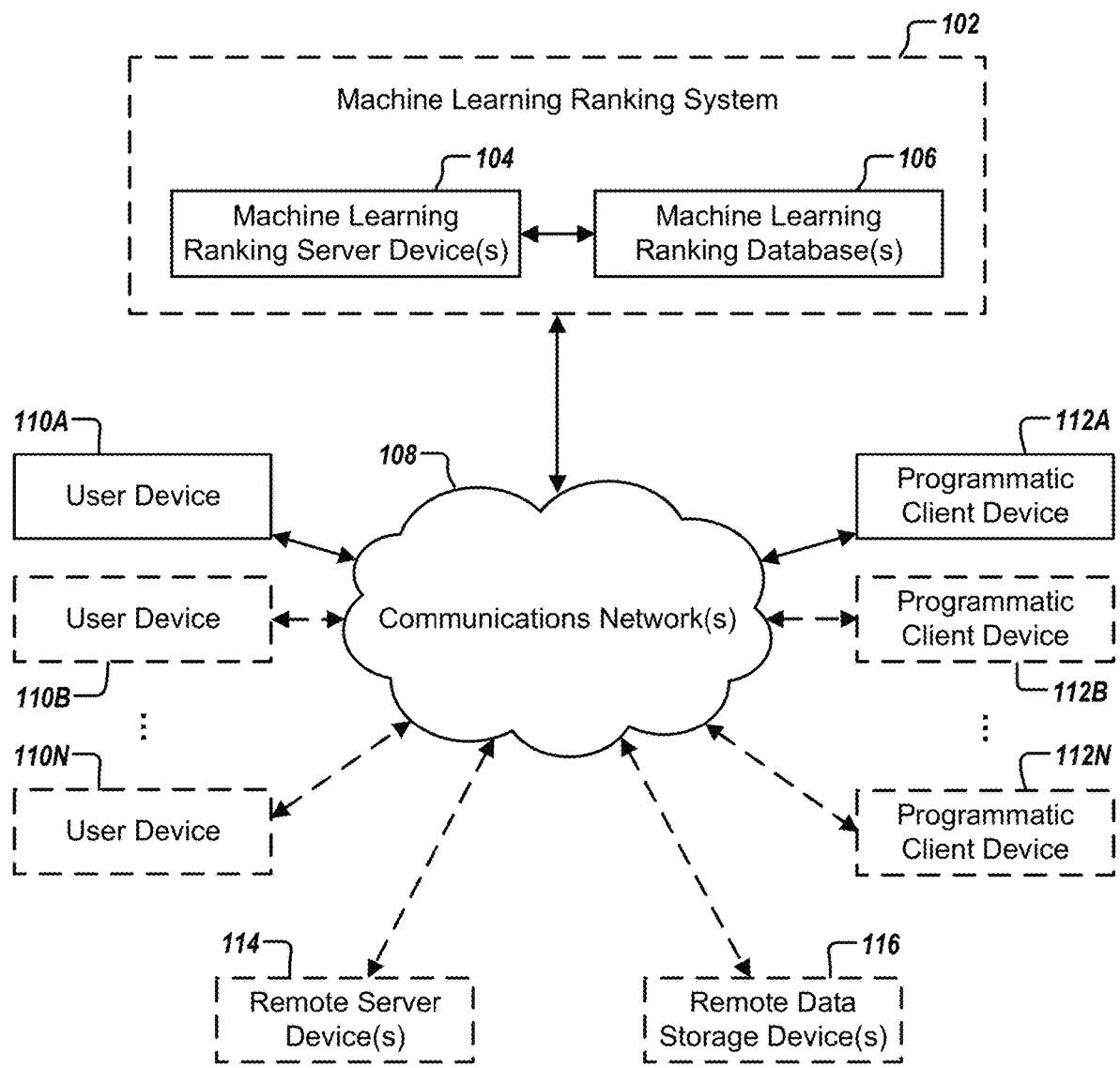
FIG. 1 illustrates an example system diagram in accordance with some example embodiments.

Some embodiments of the present disclosure will now be described more fully hereinafter with reference to the accompanying drawings, in which some, but not all embodiments of the disclosures are shown. Indeed, these disclosures may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Like numbers refer to like elements throughout.

Overview

As noted above, computing systems, computing apparatuses, computing methods, and computer program products are described herein that provide for machine learning ranking operations. Machine learning is a subfield of computer science that gives computers the ability to learn without being explicitly programmed. Evolved from the study of pattern recognition and computational learning theory in artificial intelligence, machine learning explores the study and construction of algorithms that may learn from and make predictions on data. Such algorithms overcome following strictly static program instructions by making data-driven predictions or decisions through building a machine learning model from sample inputs. Machine learning is employed in a range of computing tasks where designing and programming explicit algorithms with good performance is difficult or infeasible.

Machine learning enables prediction-making through the use of specialized circuitry, computers, or both. Machine learning may be unsupervised for exploratory data analysis. Machine learning may also be unsupervised and be used to learn and establish baseline behavioral profiles for various entities and then used to find meaningful anomalies. Machine learning is used to devise complex models and algorithms that lend themselves to prediction; also known as predictive analytics. These machine learning models allow researchers, data scientists, engineers, and analysts to produce reliable, repeatable decisions and results, and uncover hidden insights through learning from historical relationships and trends in the data.

Promotion and marketing services utilize machine learning to facilitate the matching of millions of the deals organized in different verticals and taxonomies with the demand across twenty or more countries around the world. Modeling such complex relationships requires sophisticated machine learning models that utilize hundreds of customer, context, and deal features. Customers discover deals by directly entering the search query or browsing on the mobile or desktop devices. Traditionally, search engines generate search results for such a search query using a single, fixed machine learning model, such as a Bayesian fixed model.

In contrast to these traditional fixed-model systems, the present disclosure provides a data-driven framework that allows a machine learning ranking system to generate search results using multiple different machine learning model execution engines for multiple different search result types. In some embodiments, the present disclosure provides a series of techniques used to improve various parts of Search and Ranking algorithms by utilizing the embeddings representations of customer, context, and deal features. In some embodiments, the present disclosure provides improvements to Query Understanding, Deal Classification, Deal Ranking, and computation of an Image Propensity to Purchase that leverage respective embedding feature representations. In some embodiments, embeddings encode rich deal and customer information, such as vertical, gender, price, and context (e.g., location, time-of-day), using only d bits from the dense d-dimensional space. In some embodiments, the present disclosure provides techniques for moving away from traditional feature engineering in favor of embeddings as new machine learning models are implemented.

In some embodiments, the present disclosure relates to a machine learning ranking system for performing various machine learning ranking operations disclosed herein. In some embodiments, the machine learning ranking system may provide for receiving a search query. In some embodiments, the machine learning ranking system may provide for determining a first machine learning model execution engine based on the search query and a first search result type. In some embodiments, the machine learning ranking system may provide for determining a second machine learning model execution engine based on the search query and a second search result type. In some embodiments, the machine learning ranking system may provide for generating a first subset of search results based on the first machine learning model execution engine and the search query. In some embodiments, the machine learning ranking system may provide for generating a second subset of search results based on the second machine learning model execution engine and the search query. In some embodiments, the machine learning ranking system may provide for generating a set of search results comprising at least one search result from the first subset of search results and at least one search result from the second subset of search results.

In some embodiments, these and other embodiments described herein provide for at least two techniques for offline model development to influence online model development: (i) publishing a model to flux prod and run an experiment in an optimization and insights platform for paid media channels; and (ii) publishing new features to a feature store, which provides access to a batch API and a real-time API that both serve the same data. In some instances, the embedded execution engine of Flux may be configured to accept a number of feature vectors as its inputs. In some instances, the machine learning raking system may be configured to contain feature transformation information, feature generation information, any other suitable feature information, or a combination thereof. In some instances, all data in elasticsearch indexes is populated by an indexer, such as an indexer comprised by the machine learning ranking system. In some instances, user data, deal data, and other data that is used by the Embedded Scoring is in the form of Feature Vectors.

There are many advantages of these and other embodiments described herein, such as: providing for offline machine learning model development; providing multiple different techniques for offline model development to influence online model development; providing for integration of offline model prototypes into online production environments in a less time-consuming manner that is also less prone to errors; providing a mechanism that versions the contract between data scientists and engineers, enabling fast iteration while facilitating the maintenance of a stable production environment; supporting, depending on the use case, an offline batch execution or a real-time or streaming paradigm; providing monitoring and archiving functionalities to enable key activities such as A/B testing of models and offline analytics; expediting the deployment, execution, and monitoring of machine learning models. Among other features, these and other embodiments described herein at least: reflect improvements in the functioning of computing systems or devices, such as information systems (including, but not limited to, information retrieval systems, search engines, and machine learning ranking systems and related server devices, client devices, and databases), server devices, client devices, and combinations thereof; reflect improvements to other technologies or technical fields as described herein (e.g., machine learning ranking); and effect transformations or reductions of particular articles to different states or things, such as unstructured data, data structures (e.g., search data structures), search results, electronic signals, other articles described herein, and combinations thereof.

Definitions

As used herein, the terms "data," "content," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, cloud utilities, relays, routers, network access points, base stations, hosts, and/or the like.

The term "comprising" means including but not limited to, and should be interpreted in the manner it is typically used in the patent context. Use of broader terms such as comprises, includes, and having should be understood to provide support for narrower terms such as consisting of, consisting essentially of, and comprised substantially of.

The phrases "in some embodiments," "in other embodiments," "in some instances," and the like generally mean that the particular feature, structure, or characteristic following the phrase may be included in at least one embodiment of the present disclosure, and may be included in more than one embodiment of the present disclosure (e.g., such phrases may not necessarily refer to the same embodiment).

The word "example" is used herein to mean "serving as an example, instance, or illustration." Any implementation described herein as "example" is not necessarily to be construed as preferred or advantageous over other implementations.

If the specification states a component or feature "may," "can," "could," "should," "typically," "optionally," "generally," "additionally," "alternatively," "for example," "often," or "might" (or other such language) be included or have a characteristic, that particular component or feature is not required to be included or to have the characteristic. Such component or feature may be optionally included in some embodiments, or it may be excluded.

The terms "processor" and "processing circuitry" are used herein to refer to any programmable microprocessor, microcomputer or multiple processor chip or chips that can be configured by software instructions (e.g., applications) to perform a variety of functions, including the functions of the various embodiments described above. In some devices, multiple processors may be provided, such as one processor dedicated to wireless communication functions and one processor dedicated to running other applications. Software applications may be stored in the internal memory before they are accessed and loaded into the processors. The processors may include internal memory sufficient to store the application software instructions. In many devices the internal memory may be a volatile or nonvolatile memory, such as flash memory, or a mixture of both. The memory may also be located internal to another computing resource (e.g., enabling computer-readable instructions to be downloaded over the Internet or another wired or wireless connection).

For the purposes of this description, a general reference to "memory" refers to memory accessible by the processors including internal memory or removable memory plugged into the device, remote memory (e.g., cloud storage), memory within the processors themselves, or a combination thereof. For instance, memory may be any non-transitory computer-readable storage medium having computer-readable instructions (e.g., computer-readable program code instructions) stored thereof that are executable by a processor.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, kiosk computers, smartphones, smartwatches, headsets, smart speakers, and similar electronic devices equipped with at least a processor configured to perform the various operations described herein. Computing devices such as smartphones, laptop computers, tablet computers, headsets, and smartwatches are generally referred to herein as mobile devices.

The terms "server" and "server device" are used to refer to any computing device capable of functioning as a server, such as a master exchange server, web server, mail server, document server, or any other type of server. A server may be a dedicated computing device or a computing device including a server module (e.g., an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

The terms "circuitry," "module," "utility," and other similar terms should be understood broadly to include hardware. In some embodiments, these terms may also include software for configuring the hardware. For example, in some embodiments, "circuitry" may include processing circuitry, memory, communications circuitry, input-output circuitry, other circuitry, or a combination thereof. In some embodiments, other elements of the present disclosure may provide or supplement the functionality of particular circuitry, modules, or utilities.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

As used herein, the terms "user," "client," "consumer," and "customer" may be used interchangeably to refer, without limitation, to a client, customer, purchaser, shopper, user and the like who may be using a client device to receive and interact with a device rendered object.

The term "device rendered object" may be used to refer to a set of executable instructions that, when executed by a processor of a computing device, renders an object for display. An example of a device rendered object may be an instrument of a promotion. The instrument may be any type of gift card, tender, electronic certificate, medium of exchange, voucher, or the like that embodies terms of a promotion from which the instrument resulted and may be used toward at least a portion of the purchase, acquisition, procurement, consumption or the like of goods, services and/or experiences. In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value, and/or a residual value. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiration or other violation of a redemption parameter, the return or exchange value of the instrument and/or the like.

In embodiments, each device rendered object has associated data indicating one or more categories (such as a restaurant promotion, a spa promotion, a travel promotion, a local promotion, etc.), sub-categories (such as a sushi restaurant), location, hyper-locations, prices or the like. For example, an object may be associated with a gym, and the gym may be associated with category data such as "beauty, wellness, and healthcare," "food and drink," "leisure offers and activities" and/or "services." A gym may also have more than one location, and may be able to provide promotions in a variety of price ranges and time frames. The device rendered object may be further associated with sub-category data such as "Chinese food" or "Mexican food."

As used herein, the term "device rendered object service" may include a service that is accessible via one or more computing devices and that is operable to provide device rendered object services on behalf of one or more providers that are offering one or more instruments that are redeemable for goods, services, experiences and/or the like. In some examples, the device rendered object service may take the form of a redemption authority, a payment processor, a rewards provider, an entity in a financial network, a promoter, an agent and/or the like. As such, the device rendered object service is, in some example embodiments, configured to present one or more device rendered objects (e.g., promotions) to client devices, accept payments for device rendered objects from client devices, issue instruments upon acceptance of an object, participate in redemption, generate rewards, provide a point of sale device or service, issue payments to providers and/or otherwise participate in the exchange of goods, services or experiences for currency, value and/or the like.

In some embodiments, device rendered objects may have associated therewith one or more attributes. It should be understood that each of the attributes discussed in this application, may be in some embodiments a primary or a secondary attribute. A list of example attributes is provided below.

In some implementations, one attribute may represent category data, specifically beauty, wellness and healthcare. To determine a normalized value of the one attribute, an algorithm may be executed on associated raw data related to a device rendered object transaction. For example, if the category data associated with a device rendered object transaction is "beauty, wellness and healthcare," the value of the one attribute is 1. If the category data associated with a device rendered object transaction is not "beauty, wellness and healthcare," the value of the one attribute is 0.

In some embodiments, a number of example attributes relate to category data and sub-category data. There is also a number of attributes related to location data. It should be understood that attribute data related to location and hyper location data may be generated in a similar fashion. For example, if the location data associated with a device rendered object transaction is "Chicago," the value of a corresponding attribute may be 1. If the category data associated with a device rendered object transaction is not "Chicago," the value of the corresponding attribute may be 0.

It should also be understood that device rendered object transactions may have associated data indicating one or more categories, sub-categories, location, hyper-locations, prices or the like. For example, a device rendered object transaction may be associated with a gym, and the gym may be associated with category data such as "beauty, wellness, and healthcare," "Food and drink," "Leisure Offers and Activities" and/or "Services." A gym may also have more than one location, and may be able to provide promotions in a variety of price ranges and time frames.

Example attribute data may also be associated with review websites such as Yelp®, Google®, Yahoo®, City Search®, Trip Advisor®. It should be understood that any review website could have associated attribute data, such as for example Zagat®, Bing® or the like. It should also be understood that attribute data associated with reviews related to one or more categories may be generated. For example, a website may provide reviews related to a provider's food, service, décor, price or the like. Attribute data may be generated related to each of one or more categories, such as a provider's food, service, décor, price, or the like.

It should also be understood that a location, hyper-location, category or sub-category may affect data available for the provider of a promotional transaction. For example, device rendered object transactions purchased from providers from different locations (e.g., different countries, states, neighborhoods or the like) may be associated with different attribute data. For example, different countries have different credit reporting rules and agencies. Thus, a promotion and marketing system may utilize a first combination of attributes for a device rendered object transaction from a provider in a first location, hyper-location, category or sub-category and a second combination of attributes for a device rendered object transaction from provider in a second location, hyper-location, category or sub-category.

In one implementation, other attribute data may be used. For example, attribute "bad month" may relate to identifying device rendered object transactions associated with booking months where prior device rendered object transactions have involved products, services, and/or other offerings in one or more categories categorized as having high return rates based on prior performance data. The feature may be normalized such that if the sub-category of the device rendered object transaction is associated with high return rates, the attribute is 1, else the attribute is 0. Other example attributes are "bad market," which may be normalized such that if the device rendered object transaction requires travel to a location and/or hyper local region associated with high return rates, the attribute is 1, else the attribute is 0. Another example feature is "average price for sub-category."

Similar attributes may be clustered, grouped, or aggregated. For example, attributes associated with locations or location based attributes may be grouped under header attribute "location." For example, a division attributes specifying a division where the promotion is offered and an attribute specifying a distance from a center of a city where a promotion is offered may be clustered under the location header attribute. Similarly, attributes associated with "past performance," "category & service," "completion," "maximum capacity," "hero score," "review data" may each also be clustered and/or grouped under header attributes. For example, with respect to device rendered object transaction associated with a merchant providing a service, attributes specifying past performance data may be for (1) the same merchant and the same service, (2) only the same merchant, (3) only the same service may be clustered under attribute header "past performance." Table A shows example attributes.

TABLE A

| Type | Features |
| --- | --- |
| Location | division, distance to city, etc. |
| past performance | same merchant & service, same service, same merchant, etc. |
| category & service | service header, primary deal service, etc. |
| booking month | holiday, pre-holiday, etc. |
| maximum capacity | units_avail, etc. |
| hero score | predicted 30 day bookings, predicted 60 day bookings, etc. |
| review data | yelp_n_review, yelp_rating, yelp_avil, google_n_review, facebook_fans, etc. |

The clustered or the non-clustered attributes may be used to train a machine learning model. It should be understood that the selection of attributes or clusters of attributes for training machine learning models may greatly affect the model performance. In some implementations, attributes and/or clusters of attributes are selected based on statistical analysis. In some implementations, selection of the most significant attributes is based on one or more different attribute selection approaches. These approaches may be (1) forward selection, which is starting with the most significant attributes and incrementally adding a next significant attribute until the model is stable; (2) backward elimination, which starts with all the attributes and exclude the non-significant attributes one by one until the model is stable; (3) a combination of forward selection and backward elimination; and (4) checking the significance of the attribute by statistical model (regression). In one embodiment, each attribute selection approach may give a subset of significant attributes. The attributes that are not shown to be significant by one or more of the attribute selection approaches may be excluded from the model.

As used herein, the terms "provider" and "merchant" may be used interchangeably and may include, but are not limited to, a business owner, consigner, shopkeeper, tradesperson, vendor, operator, entrepreneur, agent, dealer, organization or the like that is in the business of providing a good, service or experience to a consumer, facilitating the provision of a good service or experience to a consumer and/or otherwise operating in the stream of commerce. The "provider" or "merchant" need not actually market a product or service via the device rendered object service, as some merchants or providers may utilize the device rendered object service only for the purpose of gathering client profile information, vector activity information, similarity table information, or the like.

The term "device rendered object interaction" refers to electronic interaction with a device rendered object by a client device. In some examples, the device rendered object interaction may take the form of an accessing or selection of the device rendered object, a viewing of the device rendered object on an electronic display, a scrolling over the device rendered object, a retrieval of the device rendered object, a purchase transaction completed for the device rendered object, and/or the like.

In some embodiments, the interaction data may include various other interactions, including without limitation, scroll-over (e.g., mouse-over) events and durations, the amount of time spent by the client device viewing particular content, the rate at which impressions of particular content result in sales associated with that content, demographic information associated with each particular client using the client device, data indicating other content accessed by the client device (e.g., browser cookie data), the time or date on which content was accessed, the frequency of impressions for particular content, associations between particular clients or client demographics and particular impressions, and/or the like.

The term "device rendered object interaction signal" refers to electronic indication that an interaction as defined above has occurred with respect to a particular device rendered object.

It should be appreciated that the term "programmatically expected" indicates machine prediction of occurrence of certain events.

As used herein, the term "likelihood" refers to a measure of probability for occurrence of a particular event. For example, the likelihood that a client device will interact with a device rendered object may be a value associated with a specific scale. In some implementations, the machine predictions discussed above and below are based, at least in part, on the "likelihood" that an event will occur. Similarly, in some implementations, machine predictions are based on attributes associated with a client profile and/or an associated device rendered object.

The term "R" refers to an open source programming language and software environment for statistical computing and graphics that is supported by the R Foundation for Statistical Computing. The R language is widely used among statisticians and data miners for developing statistical software and data analysis.

The term "Hadoop" refers to an open source software framework used for distributed storage and processing of dataset of big data using the MapReduce programming model. Hadoop includes a storage part and a processing part which is the MapReduce programming model. The term "HDFS" refers to a storage part of the core of Hadoop, known as Hadoop Distributed File System (HDFS). As referred to herein, "Gdoop" is a modified implementation of Hadoop.

Hadoop consists of computer clusters built from commodity hardware. All the modules in Hadoop are designed with a fundamental assumption that hardware failures are common occurrences and should be automatically handled by the framework. Hadoop splits files into large blocks and distributes them across nodes in a cluster. It then transfers packaged code into nodes to process the data in parallel. This approach takes advantage of data locality, where nodes manipulate the data they have access to. This allows the dataset to be processed faster and more efficiently than it would be in a more conventional supercomputer architecture that relies on a parallel file system where computation and data are distributed via high-speed networking.

The term "machine learning model" refers to a machine learning task. A machine learning model comprises a title (e.g., User Lifetime Value) and encompasses one or more target variables.

The term "target variable" refers to a value that a machine learning model is designed to predict. In some embodiments, historical data is used to train a machine learning model to predict the target variable. Historical observations of the target variable are used for such training.

The term "machine learning model experiment" refers to a method for predicting the target variables that comprise a machine learning model. The machine learning model experiment represents a certain set of features provided to a certain algorithm with a certain set of hyper-parameters. A machine learning model experiment may have associated therewith a machine learning model experiment name and a machine learning model experiment description.

The term "machine learning model selection" refers to an electronic selection of a machine learning model available for inclusion in a machine learning model experiment. A machine learning model selection may be one or more of a touch screen input, mouse click or keyboard entry input provided to a computing device, and the machine learning model selection may be made from a displayed menu of several available machine learning models.

The term "machine learning model name" refers to a string of text and/or numbers are used to identify a machine learning model.

The term "machine learning model experiment description" refers to a plurality of strings of text and/or numbers used to describe a design, notes, functionality, purpose, intention, or other information of a machine learning model experiment.

The term "machine learning model experiment creation input" refers to electronic input provided to a computing device indicating and initiating a creation of a machine learning model experiment.

The term "machine learning model experiment run" refers to an execution of a machine learning model experiment.

The term "machine learning model experiment run type" refers to the type of experiment being run on a machine learning model. A machine learning model experiment run may be of a machine learning model experiment run type, for example, a training run, a batch scoring run, and an always-on streaming run.

The term "machine learning model score" refers to a particular prediction of a value of a target variable produced by the execution of a machine learning model experiment.

Machine learning model execution includes two modules: the machine learning task itself and the context in which the machine learning task is executed. The machine learning task itself may be referred to as the "machine learning model engine" and the execution context may be referred to as the "machine learning model execution engine." Machine learning engine models and machine learning model execution engines represent an area of great volatility within the machine learning ranking context.

The term "machine learning model engine" refers to mechanisms for training a machine learning model experiment and producing a prediction using the trained artifact. The machine learning model engine encompasses the particular algorithms, libraries, and methods for training and executing machine learning model tasks. Examples of a machine learning model engine include R, Foundry, or an implementation in Java. Machine learning model engines, according to some embodiments, deliver performance metrics generated during training runs. The performance metrics may be dependent upon the particular machine learning model engine and a particular chosen algorithm employed by the machine learning model.

The term "machine learning model execution engine" refers to an execution context in which a machine learning model engine is executed. Examples of a machine learning model execution engine include executing a PySpark job on Hadoop or executing a Java scoring job on a cluster. Other examples of machine learning model execution engines include exercising a machine learning model within a MapReduce job over an HDFS file, and exercising a machine learning model by feeding tuples read from a Kafka stream. Another example of a machine learning model execution engine includes exposing a machine learning model via a representational state transfer (REST) endpoint, allowing for ad-hoc, on demand scoring. In embodiments, when a machine learning model is scored by a machine learning model execution engine, the scores produced by the machine learning model are collected and compared to later real observations of the target variable to provide metrics on machine learning model performance. By comparing predictions (or scores) to actual measurements, some embodiments provide error and correlation metrics.

The term "machine learning model engine selection" refers to an electronic selection of a machine learning model engine for executing a machine learning model experiment. A machine learning model engine selection may be one or more of a touch screen input, mouse click or keyboard entry input provided to a computing device.

The term "machine learning model experiment publishing selection" refers to an electronic selection of an option to publish a machine learning model experiment and associated data. A machine learning model experiment publishing selection may be one or more of a touch screen input, mouse click or keyboard entry input provided to a computing device.

The term "machine learning model execution environment" refers to an environment providing the execution context, or machine learning model execution engine, for executing a machine learning model engine.

The term "dataset" refers to a collection of data. A dataset may correspond to the contents of a single database table, or a single statistical data matrix, where every column of the table represents a particular variable, and each row corresponds to a given member of the dataset in question. The dataset may be comprised of tuples.

Inherent to every machine learning model is the schema of the dataset the machine learning model expects. In the present system, a dataset is defined separate from a machine learning model engine associated with a machine learning model experiment. The dataset is delivered to the machine learning model engine by the machine learning model execution engine. This enables the same machine learning model experiment source code to operate in a batch mode, a streaming mode, or a real-time mode.

In some embodiments, dataset generation is decoupled from machine learning model execution. This enables reuse of generated datasets by different machine learning model experiments and by different machine learning models.

The terms "user interface" and "UI" refer to a programmatic display for enabling the interaction between humans and a computing device. The goal of user interface design is to produce a user interface which makes it easy (e.g., self-explanatory), efficient, and enjoyable (e.g., user-friendly) to operate a computing device in a way which produces a desired result. This generally means that the operator needs to provide minimal input to achieve the desired output, and also that the computing device minimizes undesired outputs to the human. In some embodiments, performance metrics may be displayed using a user interface. In addition, scoring statistics may be gathered and when machine learning model performance crosses a particular threshold an alert may be displayed on the user interface. In some embodiments, a user interface may provide visual display of machine learning model execution run status in real-time.

The term "API" refers to an Application Programming Interface (API), which is a set of subroutine definitions, protocols, and tools for building application software. An API is a set of clearly defined methods of communication between various software components. An API may be for a web-based system, operating system, database system, computer hardware or software library. An API specification may take many forms, but often includes specifications for routines, data structures, object classes, variables or remote calls. POSIX, Microsoft Windows API, the C++ Standard Template Library and Java APIs are examples of different forms of APIs.

The terms "feature" and "features" refer to aggregations of raw data representing device rendered object interactions (e.g., transactions, clicks, computing device engagement) rolled up to an entity and combined with attributes of the entity. In some embodiments, the term "feature" refers to an individual quantifiable or categorizable property or characteristic of a phenomenon being observed. In some embodiments, supervised learning tasks use features. In some embodiments, each feature has associated therewith a "feature identifier" comprising text and/or numbers for uniquely identifying the feature.

The term "feature catalog" refers to a digital repository that maintains definitions of features and datasets.

The term "feature store" refers to a system that stores raw and generated features.

The term "feature vector" refers to a vector comprising a plurality of features. In the present embodiments, values in a feature vector are observed some time X before a value of the target variable was observed. The value X may be a standard offset or it may be dynamically generated based on when the target variable was observed. In some embodiments, the term "feature vector" refers to a vector representation of some features in a completely flat structure (types restricted to primitives). In some instances, the term "feature vector" refers to the expected input to a trained model.

The term "feature key" refers to a key for a feature that allows the feature to be uniquely identified (e.g., deal id, user id, odds key, and other suitable keys for uniquely identifying a feature).

The term "scoring" refers to the computation of a score which is a quantitative measure of how good this deal is for this query.

The term "embedded scoring" refers to a scoring library maintained by "Flux" that executes a model stored in Flux.

The term "Flux" refers to a machine learning model lifecycle management system. Flux is described in greater detail in, for example, U.S. patent application Ser. No. 16/105,525, entitled "Method, Apparatus, and Computer Program Product for Machine Learning Model Lifecycle Management," filed Aug. 20, 2018, which is incorporated herein in its entirety.

The term "ranking" refers to the computation of an ordered set of deals to show the user (based on their score).

The term "accuracy" refers to a quantitative measure of how good a model is at predicting the specific objective (e.g., CTR, expected profit, and other suitable measures).

The term "training" refers to the process of building a machine learned scoring model based on data. Performance is measured by precision of the predicted score. In some instances, this performance measure may be referred to herein as accuracy.

The term "ranking quality" refers to a quantitative measure of how good our ranking system is at providing a set of deals that maximizes a set of objectives.

The term "offline evaluation" refers to an assessment of the performance of ranking based on a set of real systems objectives (e.g., maximizing profit). The measure used by this assessment may be referred to as ranking quality.

The term "context features" refers to features that are associated with a specific event. For example, context features may refer to the values of all the API parameters for a request, or the results of a query understanding phase.

The term "DaaS" refers to data as a service. DaaS builds on the concept that data may be provided on demand.

The terms "model parameter" and "model parameters" refer to properties of data that is a part of the training dataset that are learned during training by a model classifier or other machine learning model. For example in case of a natural language processing (NLP) task: word frequency, sentence length, noun or verb distribution per sentence, the number of specific character n-grams per word, lexical diversity, etc. In the present embodiments, model parameters differ for each experiment and depend on the type of data and task at hand.

The terms "model hyper-parameter" and "model hyper-parameters" refer to properties of data that is part of the training dataset that are common for similar machine learning models and cannot be learned during training but are established or defined beforehand. A typical set of hyper-parameters for neural networks includes the number and size of the hidden layers, weight initialization scheme, learning rate and its decay, dropout and gradient clipping threshold, etc.

The term "simultaneously" refers to a relation between two events happening at relatively the same time during a time frame of reference.

The terms "REST API" and "RESTful API" refer to web service APIs that adhere to the representational state transfer (REST) architectural constraints. HTTP-based RESTful APIs are defined with the following aspects: base URL, such as http://api.example.com/resources/; an internet media type that defines state transition data elements (tells the client how to compose requests for transitions to all the next available application states; could be as simple as a URL or as complex as a Java applet); and standard HTTP methods (e.g., OPTIONS, GET, PUT, POST, and DELETE).

The term "performance metrics" refers to collected data and comparisons representing behavior of a machine learning model. For example, the performance metrics of a machine learning model may provide a measure of a level of accuracy of the predictions provided by the machine learning model.

The term "machine learning model scoring data file" refers to a file containing a trained machine learning model that is to be scored using embodiments of the present disclosure.

The term "machine learning model scoring file" refers to a script that when executed scores a trained machine learning model contained in a machine learning model scoring data file and provides an output data frame containing results of the scoring.

The terms "input data" and "input data frame" refer to a set of data that is used for scoring a trained machine learning model.

The term "memory location" refers to a location in a digital repository.

The term "machine learning model input data path" refers to a memory location at which machine learning model input data is stored and accessible.

The term "machine learning model data frame" refers to data output from a scoring operation.

The term "observation timestamp" refers to a captured instance of network time associated with when an observation was made and stored.

The term "score timestamp" refers to a captured instance of network time associated with when scored was calculated/generated and stored The terms "observation" and "observations" refer to an acquisition of an instance value of a variable at a given point in time (e.g., network time).

The term "recent observation" refers to the last observation of a variable that was captured and stored.

The term "historical observation" refers to past observations of a variable that were captured and stored. For example, an observation that was captured before the most recent observation may be referred to as a historical observation.

The term "associated observations" refers to observations of variables other than the target variable that are captured at the same time as a particular observation of the target variable.

The term "non-target variables" refers to variables other than the target variable.

The term "access" refers to the ability to retrieve any piece of data electronically from a digital repository.

It should be appreciated that the term "subset" describes a proper subset. A proper subset of set is portion of the set that is not equal to the set. For example, if elements A, B, and C belong to a first set, a subset including elements A and B is a proper subset of the first set. However, a subset including elements A, B, and C is not a proper subset of the first set.

Having set forth a series of definitions called-upon throughout this application, an example system architecture is described below for implementing example embodiments and features of the present disclosure.

System Architecture

Methods, systems, apparatuses, and computer program products of the present disclosure may be embodied by any of a variety of devices. For example, the system, apparatus, method, and computer program product of an example embodiment may be embodied by a networked device, such as one or more servers, remote servers, cloud-based servers (e.g., cloud utilities), or other network entities, configured to communicate with one or more devices, such as one or more data storage devices, user devices, or a combination thereof. Example embodiments of the user devices include any of a variety of stationary or mobile computing devices, such as a smartphone, laptop computer, tablet computer, desktop computer, electronic workstation, or any combination of the aforementioned devices.

FIG. 1 illustrates an example environment 100 of an example system of an example sets of devices and circuitries that may be involved in some example embodiments described herein. In this regard, FIG. 1 discloses an example environment 100 within which embodiments of the present disclosure may operate to perform machine learning ranking operations. As illustrated, a machine learning ranking system 102 may be connected to one or more machine learning ranking server devices 104 in communication with one or more machine learning ranking databases 106. The machine learning ranking system 102 may be connected to one or more user devices 110, one or more programmatic client devices 112, one or more remote server devices 114, and one or more remote data storage devices 116 through one or more communications networks 108. In some embodiments, one or more communications networks 108 may comprise the Internet; Ethernet; a wireless local area network (LAN); a virtual private network (VPN); a cellular network; a satellite network; a proximity-based network; a wireless personal area network (PAN), any other suitable communications network; or any combination thereof. In some embodiments, the machine learning ranking system 102 may be configured to generate a set of search results by combining subsets of search results for different search result types generated using different machine learning model execution engines as described in further detail below.

The machine learning ranking system 102 may be embodied as one or more circuitries, computers, or computing systems as described herein. The one or more machine learning ranking server devices 104 may be embodied as one or more servers, remote servers, cloud-based servers (e.g., cloud utilities), circuitries, processors, or any other suitable server devices, or any combination thereof. The one or more machine learning ranking server devices 104 may be configured to receive, process, generate, and transmit data, signals, content, and electronic information to facilitate the operations of the machine learning ranking system 102. The one or more machine learning ranking databases 106 may be embodied as one or more data storage devices, such as a Network Attached Storage (NAS) device or devices, or as one or more separate databases or servers. In some embodiments, the one or more machine learning ranking server devices 104, the one or more machine learning ranking databases 106, or a combination thereof may be configured to provide data-as-a-service (DaaS), ranking-as-a-service (RaaS), or a combination thereof.

In some embodiments, the one or more machine learning ranking databases 106 may include information accessed and stored by the machine learning ranking system 102 to facilitate the operations of the machine learning ranking system 102. For example, the one or more machine learning ranking databases 106 may store search queries, search result types, search results, machine learning model execution engine data (e.g., identifiers, links, pointers, performance metrics, metadata, and other suitable data), user interface (UI) data, any other suitable data or data structures, or any combination or combinations thereof. In some embodiments, the one or more machine learning ranking databases 106 may store user account credentials for users of one or more user devices 110A-110N, one or more programmatic client devices 112A-112N, remote server devices 114, remote data storage devices 116, or a combination thereof. In some embodiments, the one or more machine learning ranking databases 106 may store data regarding device characteristics of one or more user devices 110A-110N, one or more programmatic client devices 112A-112N, remote server devices 114, remote data storage devices 116, or a combination thereof.

The one or more user devices 110A-110N may be embodied by one or more computing devices, such as one or more "human clients" (e.g., client devices operable by humans). Information received by the machine learning ranking system 102 from the one or more user devices 110A-110N may be provided in various forms and via various methods. For example, the one or more user devices 110A-110N may be laptop computers, smartphones, netbooks, tablet computers, wearable devices, desktop computers, electronic workstations, or the like, and the information may be provided through various modes of data transmission provided by these user devices. In some embodiments, users may use one or more user devices 110A-110N to input data, such as search queries, and generate interaction data. The machine learning ranking system 102, one or more remote server devices 114, or a combination thereof may receive the data, or electronic information indicative of the data, directly or indirectly from the one or more user devices 110A-110N. The machine learning ranking system 102, one or more remote server devices 114, or a combination thereof may transmit search results, UI data, or electronic information indicative thereof directly or indirectly to the one or more user devices 110A-110N for display on a display screen communicatively connected to the one or more user devices 110A-110N. In some embodiments, users may use one or more user devices 110A-110N to display data (e.g., search results, UI data), input data, and facilitate other operations of the machine learning ranking system 102.

The one or more programmatic client devices 112A-112N may be embodied by one or more computing devices, servers, or cloud utilities. Information received by the machine learning ranking system 102 from the one or more programmatic client devices 112A-112N may be provided in various forms and via various methods. For example, the one or more programmatic client devices 112A-112N may be servers, cloud utilities, laptop computers, smartphones, netbooks, tablet computers, wearable devices, desktop computers, electronic workstations, or the like, and the information may be provided through various modes of data transmission provided by these user devices. In some embodiments, one or more programmatic client devices 112A-112N may be configured to receive, generate, store, and transmit data, such as search queries and search results, as a client service. The machine learning ranking system 102, one or more remote server devices 114, or a combination thereof may receive data directly or indirectly from, or transmit data directly or indirectly to, the one or more programmatic client devices 112A-112N.

In embodiments where a user device 110A-110N or a programmatic client device 112A-112N is a mobile device, such as a smartphone or tablet, the mobile device may execute an "app" (e.g., a thin-client application) to interact with the machine learning ranking system 102, the one or more remote servers, the one or more remote data storage devices 116, or a combination thereof. Such apps are typically designed to execute on mobile devices, such as tablets or smartphones. For example, an app may be provided that executes on mobile device operating systems such as Apple Inc.'s iOS, Google LLC's Android®, or Microsoft Corporation's Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications in a manner that allows for improved interactions between apps while also preserving the privacy and security of individual users. In some embodiments, a mobile operating system may also provide for improved communications interfaces for interacting with external devices (e.g., user devices, programmatic client devices, data storage devices). Communication with hardware and software modules executing outside of the app is typically provided via APIs provided by the mobile device operating system.

The one or more remote server devices 114 may be embodied by any suitable computing device. In some embodiments, the one or more remote server devices 114 may be embodied as one or more servers, remote servers, cloud-based servers (e.g., cloud utilities), processors, or any other suitable devices, or any combination thereof. In some embodiments, the one or more remote server devices 114 may be embodied as one or more Gdoop processing devices, such as one or more Spark clusters or Gdoop resource managers. In some embodiments, the one or more remote server devices 114 may receive, process, store, generate, and transmit data, signals, and electronic information to facilitate the operations of the machine learning ranking system 102. Information received by the machine learning ranking system 102 from one or more remote server devices 114 may be provided in various forms and via various methods. It will be understood, however, that in some embodiments, the one or more remote server devices 114 need not themselves be servers, but may be peripheral devices communicatively coupled to servers.

The one or more remote data storage devices 116 may be embodied by any suitable computing device. In some embodiments, the one or more remote data storage devices 116 may be embodied as one or more NAS devices, or as one or more separate databases or database servers. In some embodiments, the one or more remote data storage devices 116 may be embodied as one or more Gdoop storage devices, such as HDFS. In some embodiments, the one or more remote data storage devices 116 may receive, process, store, generate, and transmit data, signals, and electronic information to facilitate the operations of the machine learning ranking system 102. For example, the one or more remote data storage devices 116 may store artifacts (e.g., trained artifacts, execution artifacts). Information received by the machine learning ranking system 102 from one or more remote data storage devices 116 may be provided in various forms and via various methods. It will be understood, however, that in some embodiments, the one or more remote data storage devices 116 need not themselves be databases or database servers, but may be peripheral devices communicatively coupled to databases or database servers.

Additionally or alternatively, the one or more user devices 110A-110N, the one or more programmatic client devices 112A-112N, the one or more remote server devices 114, the one or more remote data storage devices 116, or any combination thereof may interact with the machine learning ranking system 102 over one or more communications networks 108. As yet another example, the one or more user devices 110A-110N, the one or more programmatic client devices 112A-112N, the one or more remote server devices 114, the one or more remote data storage devices 116, or any combination thereof may include various hardware or firmware designed to interface with the machine learning ranking system 102. For example, an example user device 110A may be a user's laptop and may have an application stored thereon facilitating communication with the machine learning ranking system 102, whereas another example user device 110B may be a user's smartphone and may have another application stored thereon facilitating communication with the machine learning ranking system 102. As yet another example, an example programmatic client device 112A may be a data scientist's computing device and may have an application stored thereon facilitating communication with the machine learning ranking system 102, whereas another example programmatic client device 112A-112N may be a purpose-built device offered for the primary purpose of communicating with the machine learning ranking system 102. As yet another example, a plurality of example remote server devices 114 and example remote data storage devices 116 may operate together as a Hadoop cluster configured to communicate with the machine learning ranking system 102.

As a foundation for some embodiments, the machine learning ranking system 102 may utilize a data-driven framework to generate search results using multiple different machine learning model execution engines for multiple different search result types. In some embodiments, the machine learning ranking system 102 may provide for decoupling online experimentation from offline model development and prototyping. In some embodiments, the machine learning ranking system 102 may provide for receiving a search query from a computing device, such as a user device 110, a programmatic client device 112, a remote server device 114, a remote data storage device 116, a machine learning ranking server device 104, a machine learning ranking database 106, or a combination thereof.

In some embodiments, the machine learning ranking system 102 may provide for determining a first machine learning model execution engine based on the search query and a first search result type. In some embodiments, the machine learning ranking system 102 may provide for determining a second machine learning model execution engine based on the search query and a second search result type, wherein the second machine learning model execution engine is different from the first machine learning model execution engine, and wherein the second search result type is different from the first search result type.

In some embodiments, the machine learning ranking system 102 may provide for generating a first subset of search results based on the first machine learning model execution engine and the search query. In some embodiments, the machine learning ranking system 102 may provide for generating a second subset of search results based on the second machine learning model execution engine and the search query, wherein the second subset of search results is different from the first subset of search results. For example, the second subset of search results may include one or more search results that are not included in the first subset of search results. In another example, the first subset of search results may include one or more search results that are not included in the second subset of search results. In yet another example, the first subset of search results and the second subset of search results may be disjoint subsets of search results that have no search result in common.

In some embodiments, the machine learning ranking system 102 may provide for generating a set of search results comprising at least one search result from the first subset of search results and at least one search result from the second subset of search results. In some embodiments, the machine learning ranking system 102 may provide for transmitting the set of search results to a computing device, such as a user device 110, a programmatic client device 112, a remote server device 114, a remote data storage device 116, a machine learning ranking server device 104, a machine learning ranking database 106, or a combination thereof.

Example Implementing Apparatus

Figure 2:
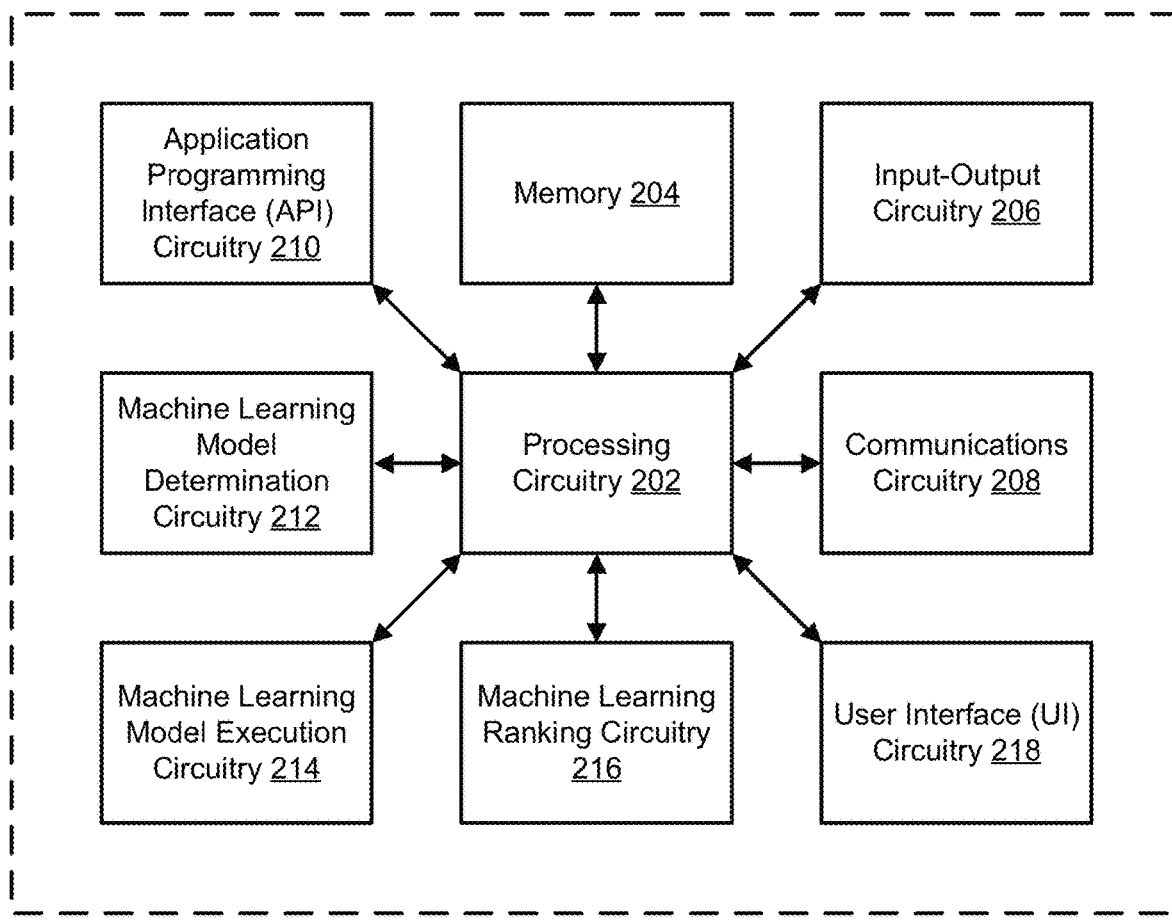
FIG. 2 illustrates an example schematic block diagram of an example apparatus in accordance with some example embodiments.

The machine learning ranking system 102 described with reference to FIG. 1 may be embodied by one or more computing apparatuses, such as apparatus 200 shown in FIG. 2. As illustrated in FIG. 2, the apparatus 200 may include processing circuitry 202, memory 204, input-output circuitry 206, communications circuitry 208, application programming interface (API) circuitry 210, machine learning model determination circuitry 212, machine learning model execution circuitry 214, machine learning ranking circuitry 216, and user interface (UI) circuitry 218.

The apparatus 200 may be configured to execute the operations described above with respect to FIG. 1 and below with respect to FIGS. 3-5. Although some of these components 202-218 are described with respect to their functional capabilities, it should be understood that the particular implementations necessarily include the use of particular hardware to implement such functional capabilities. It should also be understood that certain of these components 202-218 may include similar or common hardware. For example, two sets of circuitry may both leverage use of the same processor, network interface, storage medium, or the like to perform their associated functions, such that duplicate hardware is not required for each set of circuitry.

The use of the term "circuitry" as used herein with respect to components of the apparatus 200 therefore includes particular hardware configured to perform the functions associated with respective circuitry described herein. Of course, while the term "circuitry" should be understood broadly to include hardware, in some embodiments, circuitry may also include software for configuring the hardware. For example, in some embodiments, "circuitry" may include processing circuitry, storage media, network interfaces, input-output devices, and other components. In some embodiments, other elements of the apparatus 200 may provide or supplement the functionality of particular circuitry. For example, the processing circuitry 202 may provide processing functionality, memory 204 may provide storage functionality, and communications circuitry 208 may provide network interface functionality, among other features.

In some embodiments, the processing circuitry 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. For example, the memory 204 may be an electronic storage device (e.g., a computer-readable storage medium). In another example, the memory 204 may be a non-transitory computer-readable storage medium storing computer-executable program code instructions that, when executed by a computing system, cause the computing system to perform the various operations described herein. The memory 204 may be configured to store information, data, content, applications, instructions (e.g., computer-executable program code instructions), or the like, for enabling the apparatus 200 to carry out various functions in accordance with example embodiments of the present disclosure. For example, the memory 204 may be configured to store search queries, search result types, search results, machine learning model execution engine data (e.g., identifiers, links, pointers, performance metrics, metadata, and other suitable data), UI data, any other suitable data or data structures, or any combination or combinations thereof. It will be understood that the memory 204 may be configured to store partially or wholly any electronic information, data, data structures, embodiments, examples, figures, processes, operations, techniques, algorithms, instructions, systems, apparatuses, methods, or computer program products described herein, or any combination thereof.

The processing circuitry 202 may be embodied in a number of different ways and may, for example, include one or more processing devices configured to perform independently. Additionally or alternatively, the processing circuitry 202 may include one or more processors configured in tandem via a bus to enable independent execution of instructions, pipelining, multithreading, or a combination thereof. The use of the term "processing circuitry" may be understood to include a single core processor, a multi-core processor, multiple processors internal to the apparatus, remote or "cloud" processors, or a combination thereof.

In an example embodiment, the processing circuitry 202 may be configured to execute instructions stored in the memory 204 or otherwise accessible to the processing circuitry 202. Alternatively or additionally, the processing circuitry 202 may be configured to execute hard-coded functionality. As such, whether configured by hardware or software methods, or by a combination of hardware with software, the processing circuitry 202 may represent an entity (e.g., physically embodied in circuitry) capable of performing operations according to an embodiment of the present disclosure while configured accordingly. As another example, when the processing circuitry 202 is embodied as an executor of program code instructions, the instructions may specifically configure the processor to perform the operations described herein when the instructions are executed.

In some embodiments, the apparatus 200 may include input-output circuitry 206 that may, in turn, be in communication with processing circuitry 202 to provide output to the user and, in some embodiments, to receive input such as a command provided by the user. The input-output circuitry 206 may comprise a user interface, such as a graphical user interface (GUI), and may include a display that may include a web user interface, a GUI application, a mobile application, a client device, or any other suitable hardware or software. In some embodiments, the input-output circuitry 206 may also include a keyboard, a mouse, a joystick, a display device, a display screen, a touch screen, touch areas, soft keys, a microphone, a speaker, or other input-output mechanisms.

The input-output circuitry 206, processing circuitry 202, or both (e.g., the input-output circuitry 206 may utilize the processing circuitry 202) may be configured to control one or more functions of one or more user interface elements through computer-executable program code instructions (e.g., software, firmware) stored in a non-transitory computer-readable storage medium (e.g., memory 204). Input-output circuitry 206 is optional and, in some embodiments, the apparatus 200 may not include input-output circuitry. For example, where the apparatus 200 does not interact directly with the user, the apparatus 200 may generate user interface data for display by one or more other devices with which one or more users directly interact and transmit the generated user interface data to one or more of those devices. For example, the apparatus 200, using UI circuitry 218, may generate UI data for display by one or more display devices and transmit the generated UI data to those display devices.

The communications circuitry 208 may be any device or circuitry embodied in either hardware or a combination of hardware and software that is configured to receive or transmit data from or to a network (e.g., one or more communications networks 108) or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, gateway servers, load balancers, and supporting hardware and/or software, or any other device suitable for enabling communications via a network. In some embodiments, the communications interface may include the circuitry for interacting with the antenna(s) to cause transmission of signals via the antenna(s) or to handle receipt of signals received via the antenna(s). These signals may be transmitted or received by the apparatus 200 using any of a number of Internet, Ethernet, cellular, satellite, or wireless technologies, such as IEEE 802.11, Code Division Multiple Access (CDMA), Global System for Mobiles (GSM), Universal Mobile Telecommunications System (UMTS), Long-Term Evolution (LTE), Bluetooth® v1.0 through v5.0, Bluetooth Low Energy (BLE), infrared wireless (e.g., IrDA), ultra-wideband (UWB), induction wireless transmission, Wi-Fi, near field communications (NFC), Worldwide Interoperability for Microwave Access (WiMAX), radio frequency (RF), RFID, or any other suitable technologies.

The API circuitry 210 includes hardware components designed or configured to request, receive, process, generate, and transmit data, data structures, control signals, and electronic information for use in machine learning ranking. In some embodiments, the API circuitry 210 includes hardware components designed or configured to receive a search query. In some embodiments, the API circuitry 210 may be in communication with a computing device, such as the one or more user devices 110, one or more programmatic client devices 112, one or more remote server devices 114, one or more remote data storage devices 116, any other suitable computing device or circuitry, or a combination thereof. In some embodiments, the API circuitry 210 may be configured to receive the search query from the computing device.

The machine learning model determination circuitry 212 includes hardware components designed or configured to request, receive, process, generate, and transmit data, data structures, control signals, and electronic information for use in machine learning ranking. In some embodiments, the machine learning model determination circuitry 212 includes hardware components designed or configured to determine a plurality of machine learning model execution engines based on the search query and a plurality of search result types. For example, the machine learning model determination circuitry 212 may be configured to determine a first machine learning model execution engine based on the search query and a first search result type. The machine learning model determination circuitry 212 may be further configured to determine a second machine learning model execution engine based on the search query and a second search result type, wherein the second machine learning model execution engine is different from the first machine learning model execution engine, and wherein the second search result type is different from the first search result type. The machine learning model determination circuitry 212 may be further configured to determine a third machine learning model execution engine based on the search query and a third search result type, wherein the third machine learning model execution engine is different from the first machine learning model execution engine and the second machine learning model execution engine, and wherein the third search result type is different from the first search result type and the second search result type.

The machine learning model execution circuitry 214 includes hardware components designed or configured to request, receive, process, generate, and transmit data, data structures, control signals, and electronic information for use in machine learning ranking. In some embodiments, the machine learning model execution circuitry 214 includes hardware components designed or configured to generate a plurality of subsets of search results based on the plurality of machine learning model execution engines and the search query. For example, the machine learning model execution circuitry 214 may be configured to generate a first subset of search results based on the first machine learning model execution engine and the search query. The machine learning model execution circuitry 214 may be further configured to generate a second subset of search results based on the second machine learning model execution engine and the search query. The machine learning model execution circuitry 214 may be further configured to generate a third subset of search results based on the third machine learning model execution engine and the search query. In some embodiments, the first subset of search results, the second subset of search results, and the third subset of search results may be disjoint subsets of search results having no search result in common. In other embodiments, the first subset of search results, the second subset of search results, the third subset of search results, or a combination thereof may have one or more search results in common.

The machine learning ranking circuitry 216 includes hardware components designed or configured to request, receive, process, generate, and transmit data, data structures, control signals, and electronic information for use in machine learning ranking. In some embodiments, the machine learning ranking circuitry 216 includes hardware components designed or configured to generate a set of search results based on the plurality of subsets of search results. For example, the machine learning ranking circuitry 216 may be configured to generate a set of search results comprising at least one search result from the first subset of search results, at least one search result from the second subset of search results, and at least one search result from the third subset of search results.

The UI circuitry 218 includes hardware components designed or configured to request, receive, process, generate, and transmit data, data structures, control signals, and electronic information for use in machine learning ranking. In some embodiments, the UI circuitry 218 includes hardware components designed or configured to generate UI data based on: any data, data structures, control signals, or electronic information disclosed herein; any other suitable data, data structures, control signals, or electronic information; or any combination thereof. In some embodiments, the UI circuitry 218 may be in communication with a display device (e.g., input-output circuitry 206, a user device 110, or a display device communicatively coupled thereto) and thus configured to transmit UI data to the display device. For example, the UI circuitry 218 may be configured to generate UI data and transmit the generated UI data to the input-output circuitry 206, and the input-output circuitry 206 may be configured to receive the UI data and display the received UI data on one or more display screens.

In some embodiments, each of the API circuitry 210, machine learning model determination circuitry 212, machine learning model execution circuitry 214, machine learning ranking circuitry 216, and UI circuitry 218 may include a separate processor, specially configured field programmable gate array (FPGA), application specific integrated circuit (ASIC), or cloud utility to perform the above functions. In some embodiments, the hardware components described above with reference to API circuitry 210, machine learning model determination circuitry 212, machine learning model execution circuitry 214, machine learning ranking circuitry 216, and UI circuitry 218 may, for instance, utilize communications circuitry 208 or any suitable wired or wireless communications path to communicate with a user device (e.g., one or more user devices 110), a programmatic client device (e.g., one or more programmatic client devices 112), a client service, a server device (e.g., one or more remote server devices 114), a data storage device (e.g., one or more remote data storage devices 116), each other, or any other suitable circuitry or device.

In some embodiments, one or more of the API circuitry 210, machine learning model determination circuitry 212, machine learning model execution circuitry 214, machine learning ranking circuitry 216, and UI circuitry 218 may be hosted locally by the apparatus 200. In some embodiments, one or more of the API circuitry 210, machine learning model determination circuitry 212, machine learning model execution circuitry 214, machine learning ranking circuitry 216, and UI circuitry 218 may be hosted remotely (e.g., by one or more cloud servers) and thus need not physically reside on the apparatus 200. Thus, some or all of the functionality described herein may be provided by a third party circuitry. For example, the apparatus 200 may access one or more third party circuitries via any sort of networked connection that facilitates transmission of data and electronic information between the apparatus 200 and the third party circuitries. In turn, the apparatus 200 may be in remote communication with one or more of the API circuitry 210, machine learning model determination circuitry 212, machine learning model execution circuitry 214, machine learning ranking circuitry 216, and UI circuitry 218.

As described above and as will be appreciated based on this disclosure, embodiments of the present disclosure may be configured as systems, apparatuses, methods, computer program products, services (e.g., client services, machine learning ranking as-a-service), backend network devices, other suitable devices, and combinations thereof. Accordingly, embodiments may comprise various means including entirely of hardware or any combination of software with hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices. As will be appreciated, any computer program instructions and/or other type of code described herein may be loaded onto a computer, processor or other programmable apparatus's circuitry to produce a machine, such that the computer, processor, or other programmable circuitry that executes the code on the machine creates the means for implementing various functions, including those described herein.

The one or more user devices 110, programmatic client devices 112, remote server devices 114, remote data storage devices 116, client services, client devices, remote devices, and other devices and circuitries described with reference to FIG. 1 may be embodied by one or more computing devices or systems that also may include processing circuitry, memory, input-output circuitry, and communications circuitry. For example, a remote data storage device 116 may be a database server on which computer code (e.g., C, C++, C #, java, a structured query language (SQL), a data query language (DQL), a data definition language (DDL), a data control language (DCL), a data manipulation language (DML)) is running or otherwise being executed by processing circuitry. In another example, a user device 110 may be a laptop computer on which an app (e.g., a GUI application provided by UI circuitry 218) is running or otherwise being executed by processing circuitry. In yet another example, a user device 110 may be a smartphone on which an app (e.g., a webpage browsing app) is running or otherwise being executed by processing circuitry. As it relates to operations described in the present disclosure, the functioning of these devices may utilize components similar to the similarly named components described above with respect to FIG. 2. Additional description of the mechanics of these components is omitted for the sake of brevity. These device elements, operating together, provide the respective computing systems with the functionality necessary to facilitate the communication of data with the machine learning ranking system described herein.

Figure 3:
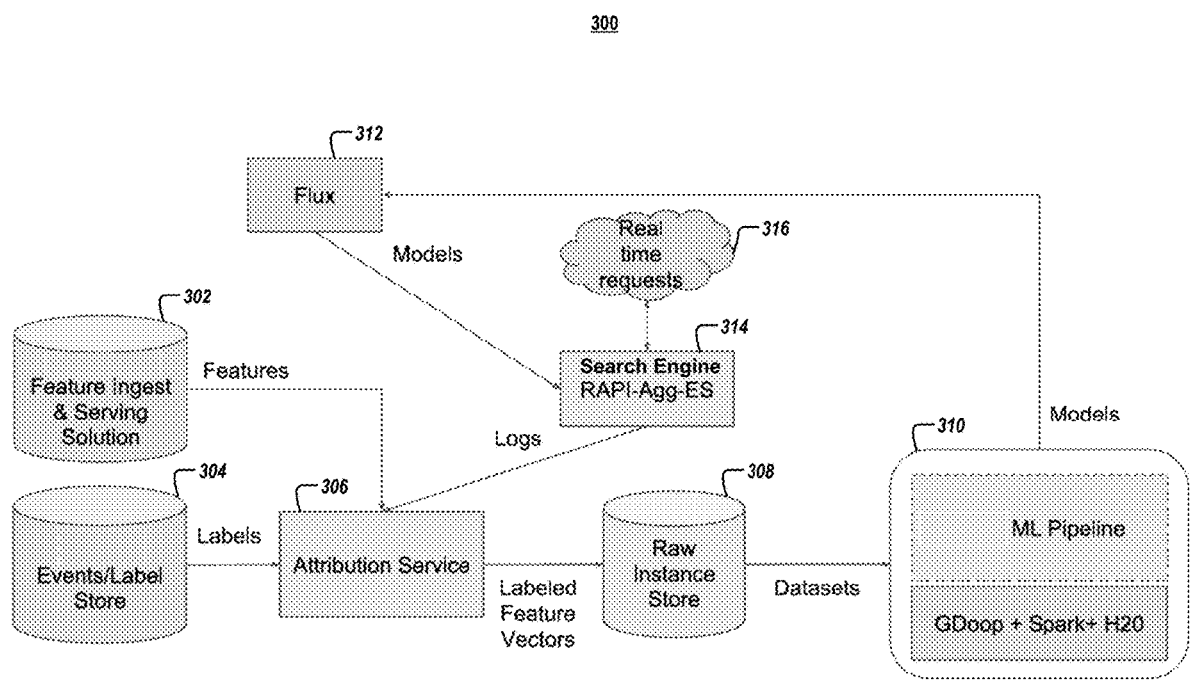
FIG. 3 illustrates an example machine learning system architecture in accordance with some example embodiments.

FIG. 3 illustrates an example machine learning system architecture 300 in accordance with some example embodiments. In some embodiments, attribution service circuitry 306 may receive (i) features data from feature ingest and serving solution storage circuitry 302, (ii) labels data from events/label storage circuitry 304, and (iii) logs data from search engine circuitry 314. Attribution service circuitry 306 may generate labeled feature vectors data based on the features data and the labels data. Raw instance storage circuitry 308 may receive labeled feature vectors data from attribution service circuitry 306. In some embodiments, machine learning models circuitry 310 may comprise a machine learning (ML) pipeline (e.g., example machine learning pipeline 400 shown in FIG. 4), GDoop circuitry, Spark circuitry (e.g., PySpark circuitry), H2O circuitry, or a combination thereof. Machine learning models circuitry 310 may receive datasets from raw instance storage circuitry 308. Flux circuitry 312 may receive machine learning models from machine learning models circuitry 310. Search engine circuitry 314 may receive machine learning models from Flux circuitry 312. Search engine circuitry 314 may further receive real-time requests 316 and transmit data responsive thereto.

Figure 4:
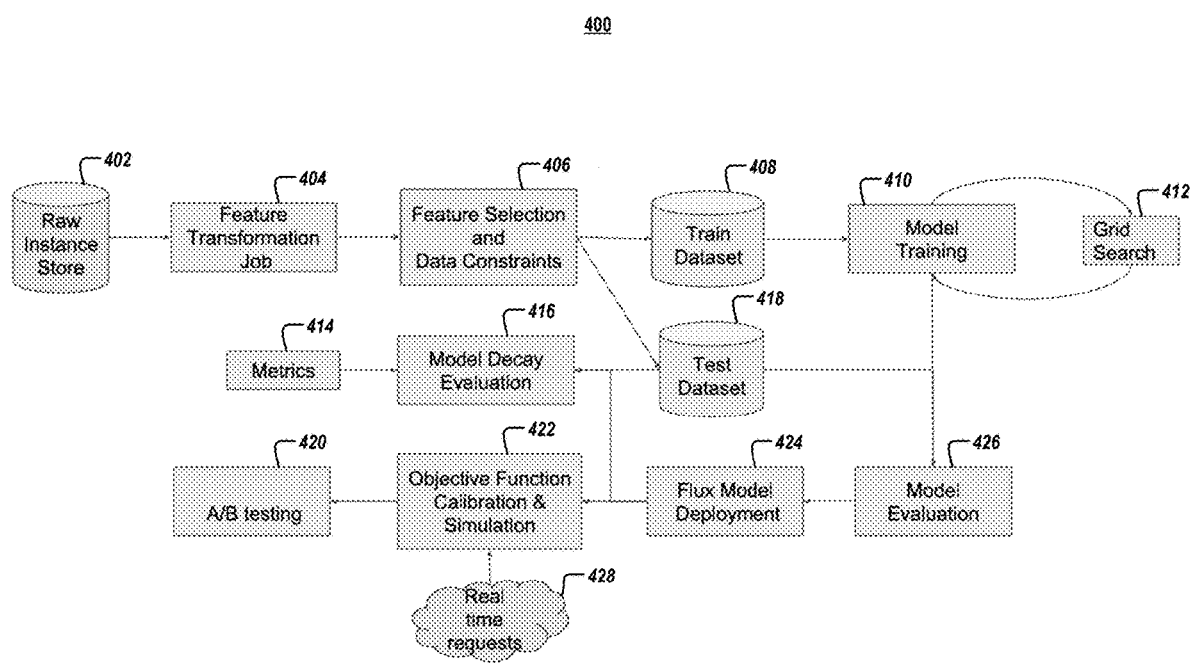
FIG. 4 illustrates an example machine learning pipeline in accordance with some example embodiments.

FIG. 4 illustrates an example machine learning pipeline 400 in accordance with some example embodiments. In some embodiments, the ML Pipeline shown in FIG. 3 may be implemented as the machine learning pipeline 400 shown in FIG. 4. In some embodiments, feature transformation job circuitry 404 may receive input from raw instance storage circuitry 402. Feature selection and data constraints circuitry 406 may receive input from feature transformation job circuitry 404. Training dataset storage circuitry 408 may receive input from feature selection and data constraints circuitry 406. Testing dataset storage circuitry 418 may receive input from feature selection and data constraints circuitry 406. Model training circuitry 410 may receive input from training dataset storage circuitry 408 and grid search circuitry 412. Grid search circuitry 412 may receive input from model training circuitry 410. Model decay evaluation circuitry 416 may receive input from metrics circuitry 414, testing dataset storage circuitry 418, and Flux model deployment circuitry 424. A/B testing circuitry 420 may receive input from objective function calibration and simulation circuitry 422. Objective function calibration and simulation circuitry 422 may receive input from Flux model deployment circuitry 424, testing dataset storage circuitry 418, and real-time requests 428. Flux model deployment circuitry 424 may receive input from model evaluation circuitry 426. Model evaluation circuitry 426 may receive input from model training circuitry 410 and testing dataset storage circuitry 418.

Having described specific components of example devices involved in the present disclosure, example procedures for machine learning ranking are described below in connection with FIG. 5.

Example Operations for Machine Learning Ranking

Figure 5:
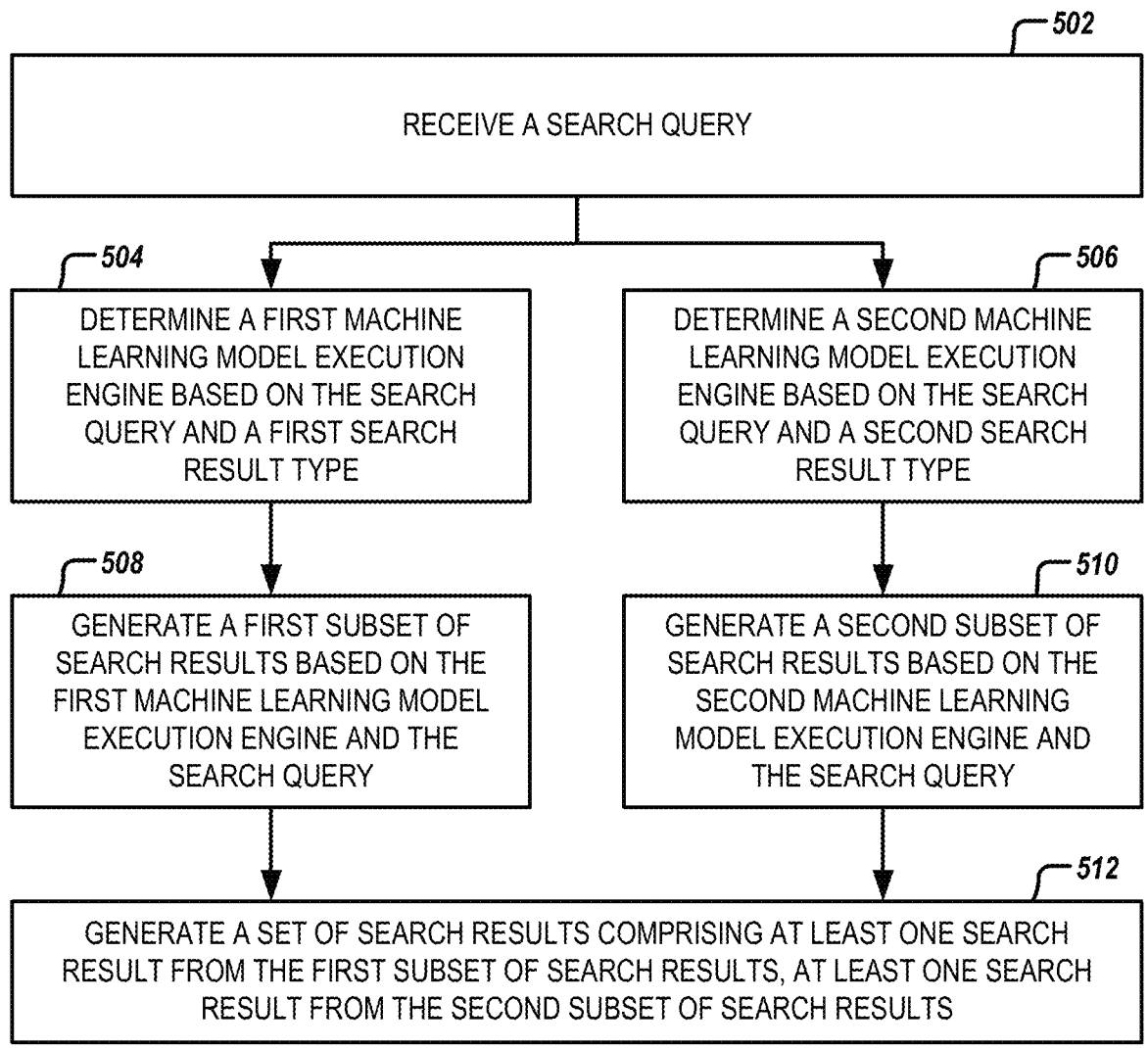
FIG. 5 illustrates an example machine learning ranking process in accordance with some example embodiments.

FIG. 5 illustrates an example flowchart 500 that contains example operations for machine learning ranking according to an example embodiment. The operations illustrated in FIG. 5 may, for example, be performed by: one or more components described with reference to machine learning ranking system 102 shown in FIG. 1, including, but not limited to, machine learning ranking server device 104 and machine learning ranking database 106; a computing device (e.g., user device 110, programmatic client device 112, remote server device 114, remote data storage device 116) in communication with machine learning ranking system 102; apparatus 200 shown in FIG. 2; one or more components illustrated with reference to example machine learning system architecture 300 shown in FIG. 3; one or more components illustrated with reference to example machine learning pipeline 400 shown in FIG. 4; any other component described herein; or any combination thereof. In some embodiments, the various operations described in connection with FIG. 5 may be performed by the apparatus 200 by or through the use of one or more of processing circuitry 202, memory 204, input-output circuitry 206, communications circuitry 208, API circuitry 210, machine learning model determination circuitry 212, machine learning model execution circuitry 214, machine learning ranking circuitry 216, UI circuitry 218, any other suitable circuitry, or any combination thereof.

As shown by block 502, the apparatus 200 includes means, such as API circuitry 210 or the like, for receiving a search query. In some embodiments, the apparatus 200 may receive the search query from a computing device (e.g., user device 110, programmatic client device 112, remote server device 114, remote data storage device 116, machine learning ranking server device 104, machine learning ranking database 106, or a combination thereof), communications circuitry (e.g., communications circuitry 208), or memory (e.g., memory 204) as described in more detail with reference to FIGS. 1-4.

As shown by block 504, the apparatus 200 includes means, such as machine learning model determination circuitry 212 or the like, for determining a first machine learning model execution engine based on the search query and a first search result type. In some embodiments, the apparatus 200 may determine the first machine learning model execution engine as described in more detail with reference to FIGS. 1-4.

As shown by block 506, the apparatus 200 includes means, such as the machine learning model determination circuitry 212 or the like, for determining a second machine learning model execution engine based on the search query and a second search result type. In some embodiments, the apparatus 200 may determine the second machine learning model execution engine as described in more detail with reference to FIGS. 1-4.

As shown by block 508, the apparatus 200 includes means, such as machine learning model execution circuitry 214 or the like, for generating a first subset of search results based on the first machine learning model execution engine and the search query. In some embodiments, the apparatus 200 may generate the first subset of search results as described in more detail with reference to FIGS. 1-4.

As shown by block 510, the apparatus 200 includes means, such as the machine learning model execution circuitry 214 or the like, for generating a second subset of search results based on the second machine learning model execution engine and the search query. In some embodiments, the apparatus 200 may generate the second subset of search results as described in more detail with reference to FIGS. 1-4.

As shown by block 512, the apparatus 200 includes means, such as machine learning ranking circuitry 216 or the like, for generating a set of search results comprising at least one search result from the first subset of search results and at least one search result from the second subset of search results. In some embodiments, the apparatus 200 may generate the set of search results as described in more detail with reference to FIGS. 1-4.

Optionally, the apparatus 200 includes means, such as the API circuitry 210 or the like, for transmitting the set of search results. In some embodiments, the apparatus 200 may transmit the set of search results to a computing device (e.g., user device 110, programmatic client device 112, remote server device 114, remote data storage device 116, machine learning ranking server device 104, machine learning ranking database 106, or a combination thereof), communications circuitry (e.g., communications circuitry 208), or memory (e.g., memory 204) as described in more detail with reference to FIGS. 1-4.

In some embodiments, the operations described with reference to FIG. 5 (e.g., operations 502, 504, 506, 508, 510, 512) may not necessarily occur in the order shown in FIG. 5, and in some cases one or more of the operations shown in FIG. 5 may occur substantially simultaneously, or additional steps may be involved before, after, or between any of the operations shown in FIG. 5.

As noted above, computing systems, computing apparatuses, computing methods, and computer program products are described herein that perform machine learning ranking. By doing so, users and clients are able to avoid the traditional problems surrounding machine learning ranking. For instance, through performance of the above operations, users may save time when searching for more accurate information due to the use of different machine learning model execution engines for different search types associated with a search query. Further, the user interfaces and data structures described herein simplify the navigation and searching of machine learning model scores and statistics and, in some instances, are more intuitive for users. Additionally, in some embodiments, the machine learning ranking system described herein improves the accuracy of machine learning prediction algorithms and the precision of recommendations (e.g., per single user) over traditional systems.

FIG. 5 thus illustrates a flowchart describing the operation of various computing systems (e.g., machine learning ranking system 102 described with reference to FIG. 1), computing apparatuses (e.g., apparatus 200 described with reference to FIG. 2), computing methods, and computer program products according to example embodiments contemplated herein. It will be understood that each operation of flowchart 500, and combinations of operations in flowchart 500, may be implemented by various means, such as hardware, firmware, processor, circuitry, and/or other devices associated with execution of software including one or more computer-executable program code instructions. For example, one or more of the procedures described above may be performed by execution of program code instructions. In this regard, the program code instructions that, when executed, cause performance of the procedures described above may be stored by a non-transitory computer-readable storage medium (e.g., memory 204) of a computing apparatus (e.g., apparatus 200) and executed by a processor (e.g., processing circuitry 202) of the computing apparatus. As will be appreciated, any such program code instructions may be loaded onto a computer or other programmable apparatus (e.g., hardware) to produce a machine, such that the resulting computer or other programmable apparatus implements the functions specified in the operations of flowchart 500. These program code instructions may also be stored in a computer-readable memory that may direct a computer or other programmable apparatus to function in a particular manner, such that the instructions stored in the computer-readable memory produce an article of manufacture, the execution of which implements the functions specified in the operations of flowchart 500. The program code instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the operations of flowchart 500.

The flowchart operations described with reference to FIG. 5 support combinations of means for performing the specified functions and combinations of operations for performing the specified functions. It will be understood that one or more operations of the flowchart, and combinations of operations in the flowchart, may be implemented by special purpose hardware-based computer systems which perform the specified functions, or combinations of special purpose hardware and computer instructions.

Use Cases

Having described example embodiments in general terms, the following example embodiments are provided to further illustrate use cases of some example embodiments. In some instances, the following example embodiments provide examples of how the machine learning ranking system disclosed herein may receive search queries and generate sets of search results based on a plurality of machine learning model execution engines for a plurality of search result types. In some instances, the following example embodiments provide examples of the ways in which the machine learning ranking system disclosed herein may generate search results based on the various data or electronic information disclosed herein.

"Cross-Profit" Use Case

"Cross-Profit" is an illustrative example use case wherein the machine learning ranking system disclosed herein may optimize multiple variables for use in machine learning ranking. In this example use case, the machine learning ranking system utilizes the machine learning ranking techniques disclosed herein to generate a maximum number of purchases where the value of a purchase is variable. At the time of subscription, the machine learning ranking system generates models for card-linked offers (CLOs) in the context of maximization for profit.

"Data Locality" Use Case

"Data Locality" is an illustrative example use case wherein the machine learning ranking system disclosed herein may utilize data locality when scoring deals for use in machine learning ranking. In this example use case, rather than utilizing a plugin, the machine learning ranking system embeds a machine learning model within a search engine. The machine learning model is configured to switch between search algorithms by switching between machine learning model execution engines. In some embodiments, the machine learning model may switch between different machine learning model execution engines for different search result types (e.g., for different sales divisions). For example, the machine learning model may switch between three different machine learning model execution engines for three different search result types (e.g., "Travel," "Goods," and "Local") based on the difference of a term's meaning within that search result type. For instance, the term "distance" has a different semantic meaning for "Travel," is not important for "Goods," and is important for "Local." Subsequently, the machine learning ranking system may generate an ordered list that combines search results using these different machine learning model execution engines for the different search result types.

CONCLUSION

While various embodiments in accordance with the principles disclosed herein have been shown and described above, modifications thereof may be made by one skilled in the art without departing from the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present disclosure. Furthermore, any advantages and features described above may relate to specific embodiments, but shall not limit the application of such issued claims to processes and structures accomplishing any or all of the above advantages or having any or all of the above features.

In addition, the section headings used herein are provided for consistency with the suggestions under 37 C.F.R. § 1.77 or to otherwise provide organizational cues. These headings shall not limit or characterize the disclosure set out in any claims that may issue from this disclosure. For instance, a description of a technology in the "Background" is not to be construed as an admission that certain technology is prior art to any disclosure in this disclosure. Neither is the "Summary" to be considered as a limiting characterization of the disclosure set forth in issued claims. Furthermore, any reference in this disclosure to "disclosure" or "embodiment" in the singular should not be used to argue that there is only a single point of novelty in this disclosure. Multiple embodiments of the present disclosure may be set forth according to the limitations of the multiple claims issuing from this disclosure, and such claims accordingly define the disclosure, and their equivalents, that are protected thereby. In all instances, the scope of the claims shall be considered on their own merits in light of this disclosure, but should not be constrained by the headings set forth herein.

Also, techniques, systems, subsystems, and methods described and illustrated in the various embodiments as discrete or separate may be combined or integrated with other systems, modules, techniques, or methods without departing from the scope of the present disclosure. Other devices or components shown or discussed as coupled to, or in communication with, each other may be indirectly coupled through some intermediate device or component, whether electrically, mechanically, or otherwise. Other examples of changes, substitutions, and alterations are ascertainable by one skilled in the art and could be made without departing from the scope disclosed herein.

Many modifications and other embodiments of the disclosure set forth herein will come to mind to one skilled in the art to which these embodiments pertain having the benefit of teachings presented in the foregoing descriptions and the associated figures. Although the figures only show certain components of the apparatus and systems described herein, it is understood that various other components may be used in conjunction with the machine learning ranking system. Therefore, it is to be understood that the disclosure is not to be limited to the specific embodiments disclosed and that modifications and other embodiments are intended to be included within the scope of the appended claims. For example, the various elements or components may be combined, rearranged, or integrated in another system or certain features may be omitted or not implemented. Moreover, the steps in any method described above may not necessarily occur in the order depicted in the accompanying figures, and in some cases one or more of the steps depicted may occur substantially simultaneously, or additional steps may be involved. Although specific terms are employed herein, they are used in a generic and descriptive sense only and not for purposes of limitation.

The invention claimed is:

1. A computing system for machine learning ranking, the computing system comprising:
   application programming interface (API) circuitry configured to
      receive a search query; and
   machine learning model determination circuitry configured to
      determine a first machine learning model execution engine based on the search query and a first search result type, and
      determine a second machine learning model execution engine based on the search query and a second search result type.

2. The computing system of claim 1, wherein the system further comprises machine learning model execution circuitry configured to:
   generate a first subset of search results based on the first machine learning model execution engine and the search query; and
   generate a second subset of search results based on the second machine learning model execution engine and the search query.

3. The computing system of claim 2, wherein the system further comprises machine learning ranking circuitry configured to generate a set of search results comprising at least one search result from the first subset of search results and at least one search result from the second subset of search results.

4. The computing system of claim 3, wherein the machine learning model determination circuitry is further configured to determine a third machine learning model execution engine based on the search query and a third search result type.

5. The computing system of claim 4, wherein the machine learning model execution circuitry is further configured to generate a third subset of search results based on the third machine learning model execution engine and the search query.

6. The computing system of claim 5, wherein the machine learning ranking circuitry is further configured to generate a set of search results comprising the at least one search result from the first subset of search results, the at least one search result from the second subset of search results, and at least one search result from the third subset of search results.

7. The computing system of claim 3, wherein the API circuitry is further configured to transmit the set of search results to a computing device.

8. A computing method for machine learning ranking, the computing method comprising:
   receiving, by application programming interface (API) circuitry, a search query;
   determining, by machine learning model determination circuitry, a first machine learning model execution engine based on the search query and a first search result type; and
   determining, by the machine learning model determination circuitry, a second machine learning model execution engine based on the search query and a second search result type.

9. The computing method of claim 8, further comprising:
   generating, by machine learning model execution circuitry, a first subset of search results based on the first machine learning model execution engine and the search query; and
   generating, by the machine learning model execution circuitry, a second subset of search results based on the second machine learning model execution engine and the search query.

10. The computing method of claim 9, further comprising:
    generating, by machine learning ranking circuitry, a set of search results comprising at least one search result from the first subset of search results and at least one search result from the second subset of search results.

11. The computing method of claim 10, further comprising:
    determining, by the machine learning model determination circuitry, a third machine learning model execution engine based on the search query and a third search result type.

12. The computing method of claim 11, further comprising:
    generating, by the machine learning model execution circuitry, a third subset of search results based on the third machine learning model execution engine and the search query.

13. The computing method of claim 12, further comprising:
    generating, by the machine learning ranking circuitry, a set of search results comprising the at least one search result from the first subset of search results, the at least one search result from the second subset of search results, and at least one search result from the third subset of search results.

14. The computing method of claim 10, further comprising:
    transmitting, by the API circuitry, the set of search results to a computing device.

15. A computer program product for machine learning ranking, the computer program product comprising at least one non-transitory computer-readable storage medium storing computer-executable program code instructions that, when executed by a computing system, cause the computing system to:
    receive a search query;
    determine a first machine learning model execution engine based on the search query and a first search result type; and
    determine a second machine learning model execution engine based on the search query and a second search result type.

16. The computer program product of claim 15, wherein the computer-executable program code instructions, when executed by a computing system, further cause the computing system to:
    generate a first subset of search results based on the first machine learning model execution engine and the search query; and generate a second subset of search results based on the second machine learning model execution engine and the search query.

17. The computer program product of claim 16, wherein the computer-executable program code instructions, when executed by a computing system, further cause the computing system to generate a set of search results comprising at least one search result from the first subset of search results and at least one search result from the second subset of search results.

18. The computer program product of claim 17, wherein the computer-executable program code instructions, when executed by a computing system, further cause the computing system to determine a third machine learning model execution engine based on the search query and a third search result type.

19. The computer program product of claim 18, wherein the computer-executable program code instructions, when executed by a computing system, further cause the computing system to generate a third subset of search results based on the third machine learning model execution engine and the search query.

20. The computer program product of claim 19, wherein the computer-executable program code instructions, when executed by a computing system, further cause the computing system to generate a set of search results comprising the at least one search result from the first subset of search results, the at least one search result from the second subset of search results, and at least one search result from the third subset of search results.

* * * * *